United States Patent
Braumandl

(10) Patent No.: US 10,083,367 B2
(45) Date of Patent: Sep. 25, 2018

(54) APPARATUS FOR A PORTABLE SMART DEVICE

(71) Applicant: Sensor Instruments Entwicklungs-und Vertriebs GmbH, Thurmansbang (DE)

(72) Inventor: Walter Braumandl, Thurmansbang (DE)

(73) Assignee: SENSOR INSTRUMENTS ENTWICKLUNGS- UND VERTRIEBS GMBH, Thurmansbang (DE)

( * ) Notice: Subject to any disclaimer, the term of this patent is extended or adjusted under 35 U.S.C. 154(b) by 136 days.

(21) Appl. No.: 15/138,317

(22) Filed: Apr. 26, 2016

(65) Prior Publication Data
US 2016/0314374 A1 Oct. 27, 2016

(30) Foreign Application Priority Data
Apr. 27, 2015 (DE) .......................... 10 2015 005 304

(51) Int. Cl.
*G07D 7/121* (2016.01)
*G06K 9/46* (2006.01)
(Continued)

(52) U.S. Cl.
CPC ............ *G06K 9/6202* (2013.01); *G06K 9/22* (2013.01); *G06K 9/4661* (2013.01); *G06K 9/78* (2013.01); *G07D 7/121* (2013.01); *H04N 5/2252* (2013.01); *H04N 5/2254* (2013.01); *H04N 5/2256* (2013.01); *H04N 5/332* (2013.01)

(58) Field of Classification Search
CPC ...... G06K 9/6202; G06K 9/22; G06K 9/4661; G06K 9/78; H04N 5/2252; H04N 5/2254; H04N 5/2256; H04N 5/332; G07D 7/121
See application file for complete search history.

(56) References Cited

U.S. PATENT DOCUMENTS 5,656,783 A * 8/1997 Frisch .................... G01B 11/16
                                                              73/800
6,252,660 B1 * 6/2001 Frisch .................... G01B 11/02
                                                              356/634
(Continued)

FOREIGN PATENT DOCUMENTS

DE          20218467 U1    3/2003
DE     102004056007 A1    5/2006
(Continued)

*Primary Examiner* — Mia M Thomas
(74) *Attorney, Agent, or Firm* — J-TEK Law PLLC; Jeffrey D. Tekanic; Scott T. Wakeman

(57) ABSTRACT

An accessory is attachable to a portable device equipped with a camera. The accessory includes a camera lens opening and a retainer that retains the portable device such that a lens of the camera of the portable device is aligned with the camera lens opening. At least one source of electromagnetic radiation in the range of ultraviolet and/or blue wavelengths is disposed on the accessory so as to illuminate an object to be authenticated when the object is disposed in front of the camera lens opening of the accessory. A spacer on the accessory positions the accessory with respect to the object to be authenticated so that the camera lens opening has a predetermined positional relationship with a to-be-examined region of the object.

21 Claims, 6 Drawing Sheets

(51) Int. Cl.
*G06K 9/62* (2006.01)
*G06K 9/22* (2006.01)
*G06K 9/78* (2006.01)
*H04N 5/225* (2006.01)
*H04N 5/33* (2006.01)

(56) References Cited

U.S. PATENT DOCUMENTS

| | | | | |
|---|---|---|---|---|
| 6,980,654 | B2 * | 12/2005 | Alasia | B42D 25/29 380/216 |
| 7,114,074 | B2 * | 9/2006 | Alasia | G06T 1/0028 380/217 |
| 7,420,663 | B2 * | 9/2008 | Wang | G01J 3/02 356/326 |
| 7,995,196 | B1 * | 8/2011 | Fraser | G06K 9/00577 356/71 |
| 8,290,275 | B2 * | 10/2012 | Sai | G01J 3/46 345/591 |
| 8,649,981 | B2 * | 2/2014 | Sipe | G06K 9/00127 382/128 |
| 9,097,957 | B2 * | 8/2015 | Pohlert | H04N 5/2354 |
| 9,195,023 | B2 * | 11/2015 | O'Neill | G02B 7/02 |
| 9,380,207 | B1 * | 6/2016 | Kozko | H04N 5/2254 |
| 9,773,141 | B2 * | 9/2017 | Kozicki | G06K 7/1099 |
| 2003/0136837 | A1 * | 7/2003 | Amon | G07D 7/04 235/435 |
| 2007/0172113 | A1 * | 7/2007 | Sai | G01J 3/46 382/159 |
| 2008/0048128 | A1 * | 2/2008 | Braumandl | G01N 21/645 250/458.1 |
| 2011/0017352 | A1 * | 1/2011 | Vandermeulen | C23C 22/77 148/241 |
| 2011/0164748 | A1 * | 7/2011 | Kohlert | B65D 65/02 380/243 |
| 2013/0020504 | A1 * | 1/2013 | Kraemer | G01N 21/6408 250/459.1 |
| 2014/0055978 | A1 * | 2/2014 | Gantz | A45C 11/00 362/8 |
| 2016/0314374 | A1 * | 10/2016 | Braumandl | G07D 7/121 |
| 2016/0363520 | A1 * | 12/2016 | Braumandl | G01N 15/0205 |
| 2017/0013220 | A1 * | 1/2017 | Staker | G02B 21/361 |
| 2018/0027155 | A1 * | 1/2018 | Nakamura | H04N 5/2254 |

FOREIGN PATENT DOCUMENTS

| | | |
|---|---|---|
| DE | 102011077904 A1 | 12/2012 |
| DE | 102011121566 A1 | 6/2013 |
| EP | 1295263 B1 | 1/2011 |
| EP | 2318286 B1 | 1/2012 |
| WO | 0201512 A1 | 1/2002 |

* cited by examiner

APPARATUS FOR A PORTABLE SMART DEVICE

CROSS-REFERENCE

The present application claims priority to German patent application serial number 10 2015 005 304.3 filed on Apr. 27, 2015, the contents of which are incorporated fully herein by reference.

TECHNICAL FIELD

The present invention generally relates to an apparatus or accessory for a portable (mobile) smart device, such as a case for a mobile phone or a tablet computer.

BACKGROUND ART

An authentication method and an authentication system, which are used for authenticating a product wrapped in a packaging film, were disclosed in EP 2 318 286 B1 and its counterpart US patent publication no. 2011/164748. The packaging film includes pigment particles randomly distributed in one area of the packaging film. A product is then packaged (wrapped, enclosed) using the packaging film that contains the randomly-distributed pigment particles. An identification code is derived (generated) from the relative positional coordinates, and optionally also from the color values, of the pigment particles, in accordance with an encryption algorithm and the identification code is recorded (stored). During the authentication process, a digital image of the area of the packaging film that contains the pigment particles is recorded (generated) by an imaging device. Then, the digital image is evaluated (analyzed) by a computer in order to derive (obtain) a check code from the relative positional coordinates of N different pigment particles, and optionally the color values of the same. The derived check code is then compared to recorded (stored) identification codes to determine whether there is a match. For example, the identification codes may include angular values of one or more polygons having m corners, where m is an integer satisfying the relationship $3 \leq m \leq N$ and the coordinates of the corners of the polygon correspond to the relative positional coordinates of m pigment particles. Pigment particles may be used, e.g., that luminesce in the range of wavelengths from 100 to 380 nm. In particular, materials that fluoresce in the visible part of the spectrum upon excitation (stimulation) with ultraviolet (UV) light or blue light may be used, such as particles that contain rare earth metals.

DE 10 2004 056 007 A1 discloses a mobile verification device for verification of travel documents. In one embodiment, a mobile communication device such as a mobile phone is used to capture (read, sense) security features on a travel document. For this purpose, the mobile phone may include an illumination unit that may be configured as an attachable module or adapter. Wavelengths in the UV and near-infrared (NIR) regions are used to determine specific security features. Because the travel document is captured (read, sensed) from different viewing angles and at different distances, the images captured by the mobile phone must be normalized into a standard size and equalized.

SUMMARY OF THE INVENTION

In one aspect of the present teachings, an accessory for a camera-equipped smart device, such as a mobile phone or a tablet computer, is disclosed that enables the authentication of objects (e.g., paper, films, etc.) containing pigment particles that fluoresce in the visible part of the spectrum upon excitation (stimulation) with ultraviolet or blue light.

For example, in another aspect of the present teachings, an accessory or apparatus may be configured to be attached, e.g., detachably attached, to a portable smart device. The apparatus may preferably include at least one holder or connector configured to attach the accessory to the portable device so that a lens of the camera of the portable device is disposed at a predetermined position with respect to the accessory or apparatus. At least one source of electromagnetic radiation in the range of ultraviolet and/or blue wavelengths (e.g., a UV and/or blue light illumination unit) is provided on or in the accessory or apparatus to illuminate a region in a field of view of the camera, such as a portion (region) of an object to be authenticated. A positioning device is configured to position the accessory or apparatus with respect to the to-be-examined region of the object to be authenticated so that the to-be-examined region is located in the field of view of the camera and the camera has a predetermined positional relationship with, e.g., is disposed at a predetermined distance from, the to-be-examined region.

By providing an accessory or apparatus for a portable smart device, e.g., in the form of a case for a mobile phone or tablet, with a UV and/or blue light illumination unit, it becomes possible to excite (stimulate) particles contained in the object to be authenticated with UV light and/or blue light. Then, the resulting fluorescence in the visible part of the spectrum may be detected (read, sensed) by the camera provided in the smart device. The accessory or apparatus also preferably includes a positioning device that ensures the correct position or positioning of the camera (or camera lens) with respect to the object to be authenticated, in particular with respect to the to-be-examined region of the object. The image (e.g., a fluorescence pattern) captured (sensed, detected) by the camera may then be evaluated (analyzed) using software executed in the smart device in order to derive check codes from the captured image that are then compared to stored (recorded) identification codes. The results of the comparison may then optionally be displayed on the screen of the smart device, thereby enabling convenient, rapid and reliable authentication of objects, such as commercial products.

Additional objects, embodiments, features and advantages of the present teachings will become apparent from the following description of detailed embodiments and from the claims with reference to the figures.

BRIEF DESCRIPTION OF THE DRAWINGS

FIG. 3A shows a plan view and FIGS. 3B-3E show side views of the first embodiment, wherein FIG. 3B shows the left side of the view in FIG. 3A, FIG. 3C shows the right side of the view in FIG. 3A, FIG. 3D shows the bottom side of the view in FIG. 3A, and FIG. 3E shows the top side of the view in FIG. 3A.

DETAILED DESCRIPTION OF THE EMBODIMENTS

In the following, exemplary embodiments of an apparatus or accessory for a portable smart device, such as a mobile phone, smart phone, tablet computer (or simply "tablet"), phablet, etc., which has been factory-provided with a camera, are described with reference to the drawings. As discussed herein, a "smart device" according to the present teachings is an electronic device having at least a display or screen, preferably a touch screen, a processor (e.g., microprocessor) and memory configured to autonomously execute programs (software) stored in the memory and to display results of the executed programs on the display or screen, preferably in a user-interactive manner, an input device, such as a touch screen, virtual or physical keypad and/or buttons, a power source (preferably a rechargeable battery), and a camera in electronic communication with the processor. Additional functions and/or electrical components optionally may be included in the smart device, such as means for wirelessly communicating with external devices (e.g., other computers, servers, the Internet, etc.), e.g., according to the IEEE 802.11 standards, and means for making telephone calls.

Figure 1:
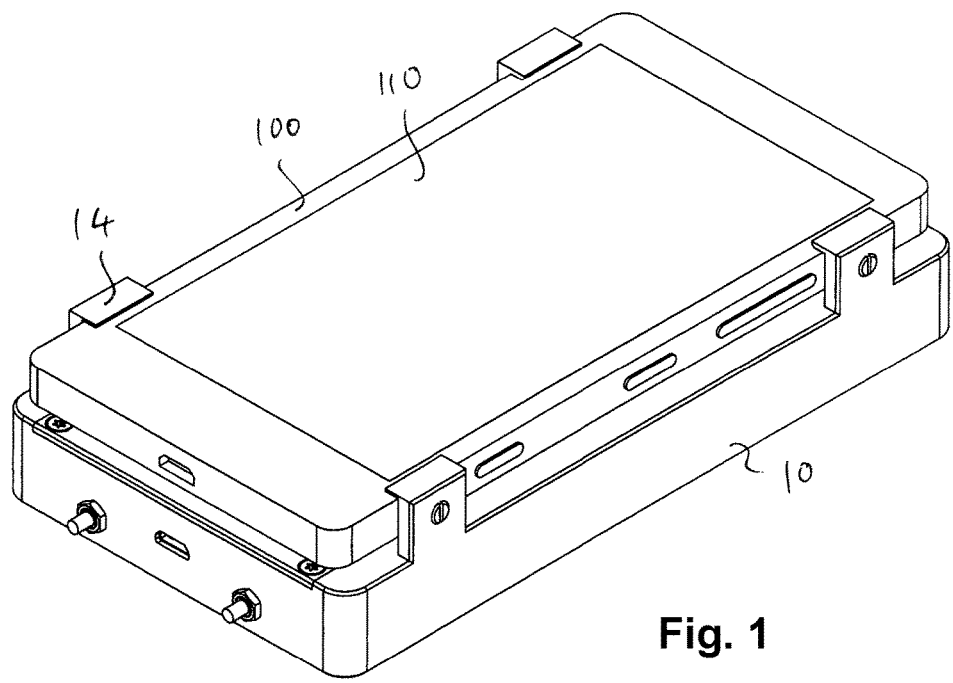
FIG. 1 is a perspective view of top surface of a first embodiment according to the present disclosure.

FIG. 1 shows a perspective view of a representative, non-limiting case 10 for a mobile phone 100 in accordance with the present teachings. Case 10 is also known in the art as a "protective case", although cases according to the present teachings need not be ruggedly designed to protect the smart device, to which it is attached. It is sufficient that the case 10 be designed to provide, e.g., an illumination unit (source of electromagnetic radiation) and a positioning device in a fixed relationship and in a manner so that these elements can be securely attached to the smart device (e.g., a mobile phone or tablet), as will be further discussed below. Thus, case 10 may be alternately configured, e.g., as a holster, slip cover, shell, folio, skin, sleeve, etc. In essence, case 10 may be configured as any type of smart device accessory that is attachable (e.g., detachably attachable) to the smart device.

Figure 2:
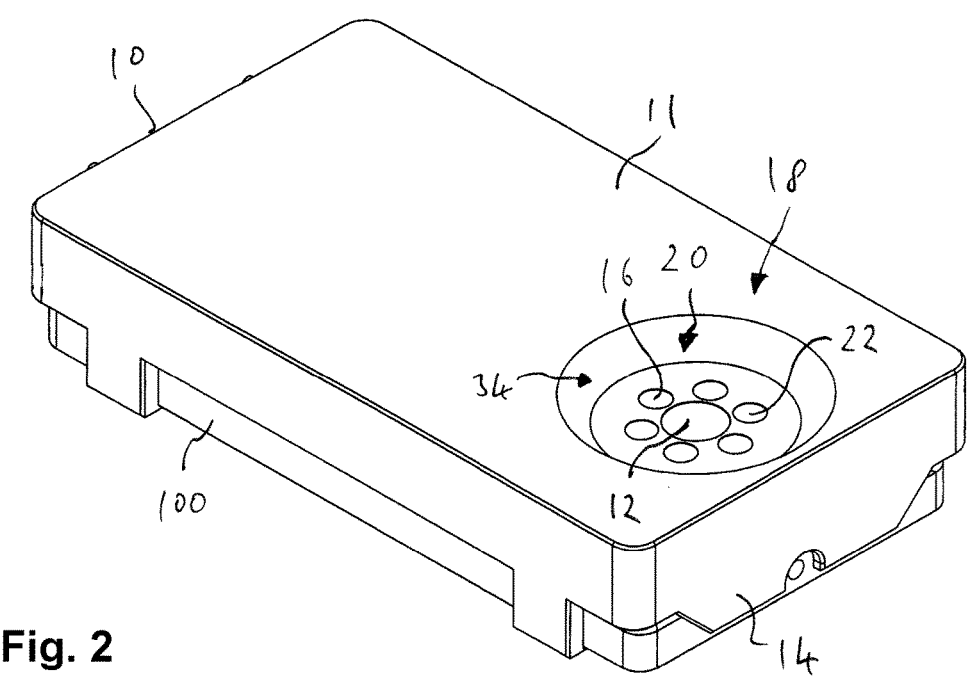
FIG. 2 is another perspective view of bottom surface of the first embodiment.

As shown in FIG. 1, case 10 of the first embodiment of the present teachings is configured in a manner that is similar to a conventional protective case for a smart phone. In particular, case 10 includes one or more retainers 14 for receiving and holding smart phone 100, e.g., for defining a receptacle into which smart phone 100 can be inserted. For example, smart phone 100 may be slid into retainer(s) 14. As shown in FIG. 2, retainer 14 includes a stop 27 located at one longitudinal end and two or more holders (e.g., connectors, clasps, projections, flanges, etc.) 25 (see FIGS. 3B and 3C discussed below), such that a fixed positional relationship between case 10 and mobile phone 100 is achieved upon insertion of mobile phone 100 into the holders and abutment against the stop. In particular, the camera (or at least the lens thereof) of mobile phone 100 is aligned with a camera lens opening 12 provided in case 10 when case 10 is attached to the mobile phone 100. Consequently, mobile phone 100 (i.e. the camera equipped therein) is capable of capturing an image through camera lens opening 12.

As shown in FIG. 2, case 10 includes a bottom surface 11 formed as a substantially planar abutment surface, and the stop and holders extend perpendicularly therefrom. Bottom surface 11 is part of a positioning device 18 configured to position case 10, or more specifically camera lens opening 12, with respect to an object to be authenticated. In the present embodiment, positioning device 18 further includes a spacer 20 formed by bottom surface 11 together with a recess 34 in the same. Camera lens opening 12 is disposed at the bottom of recess 34 and surrounded by a UV and/or blue light illumination unit (source of electromagnetic radiation) 16 and a white light illumination unit 22, which will be described in more detail below.

The spacer 20 defines a predetermined distance between camera lens opening 12, i.e., an optical system (e.g., camera lens) provided therein, which will be described in more detail below, and a to-be-examined region (area) of an object to be authenticated. Therefore, when the region or surface of the object to be authenticated, which may contain the pigment particles that fluoresce in the visible spectrum when excited with UV and/or blue light, is brought into abutment with bottom surface 11 of case 10, the predetermined distance between the to-be-examined region and camera lens opening 12, i.e., the camera lens of mobile phone 100, results. For example, case 10, with mobile phone 100 held therein, may be simply placed or rested on the region of the object to be authenticated or may be pressed against the same. Conversely, the object to be authenticated could also be positioned (rested) on bottom surface 11 of case 10.

In order to align the region containing the pigment particles with the camera (camera lens) of mobile phone 100, first of all, white light illumination unit 22 may be switched on to illuminate one or more markings provided on the surface of the object. The camera of mobile phone 100 may then capture (read, sense) the illuminated region, and the image captured by the camera may then be displayed on display (screen) 110 of mobile phone 100. Case 10 containing mobile phone 100 and/or the object may then be moved or displaced until the marking(s) on the object are visible on display 110. In this manner, it can be assured that the correct region (area) of the object to be authenticated, which region contains the pigment particles, is captured (read, sensed) by the camera of mobile phone 100. Next, white light illumination unit 22 may be switched off, and UV and/or blue light illumination unit 16 may be switched on to stimulate or excite the pigment particles, which then undergo photoexcitation. As was described above, this causes the pigment particles to fluoresce in the visible part of the spectrum and the fluorescence may be detected (captured, imaged) by the camera of mobile phone 100. The image captured in this manner may then be evaluated (analyzed) by software stored on mobile phone 100, for example, in the manner described in EP 2 318 286 B1, which is incorporated herein by reference, to derive a check code from the fluorescence pattern in the image. Previously-recorded (pre-installed) identification codes may be stored in memory of mobile phone 100, which may then be compared to the derived check code by executing the software. The comparison result, i.e., whether a successful authentication could be performed or not, may then be displayed on display (screen) 110 of mobile phone 100 for the user. Alternatively or additionally, the result may also be transmitted, e.g., wirelessly or via a wired connection, to an external device.

Figure 3D:
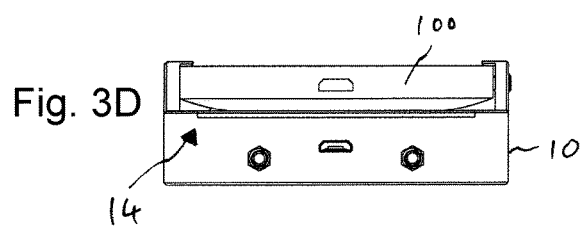
Figure 3C:
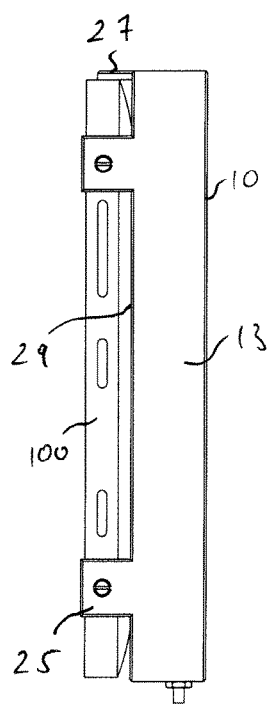
Figure 3A:
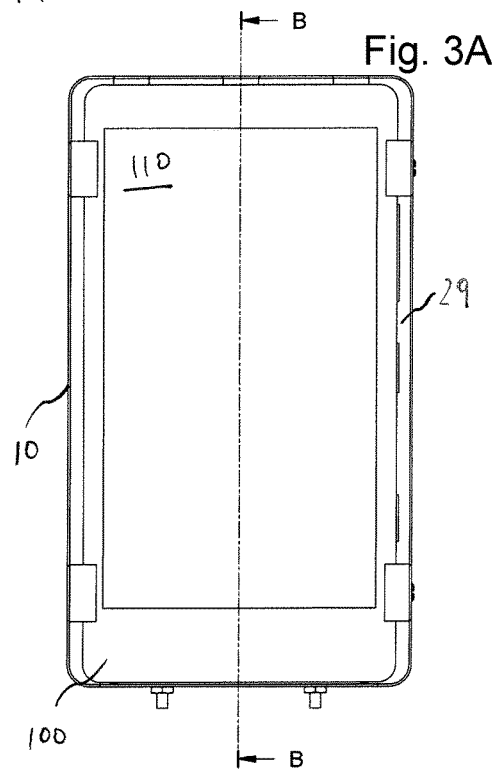
Figure 3B:
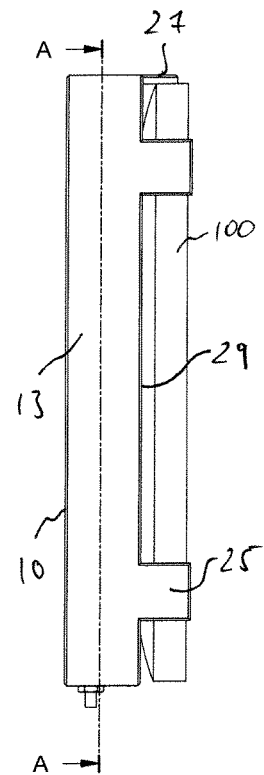
Figure 3E:
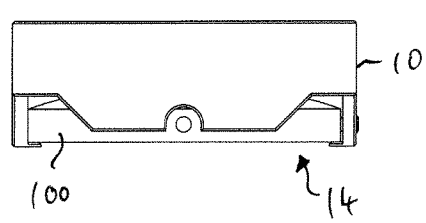

FIGS. 3A-E show a plan view and several side views of case 10 containing mobile phone 100. As shown in FIGS. 3B and 3C, case 10 includes a housing 13; the upper side of housing 13 (shown in FIG. 3E) serves as a support surface 29 for mobile phone 100. Holders (connectors, clasps, projections, tabs, etc.) 25 extend from support surface 29, similar to stop 27 formed at one longitudinal end of housing 13. Thus, mobile phone 100 may be securely and accurately positioned in or on case 10 by inserting the same into case 10 from the side opposite to stop 27.

Figure 4:
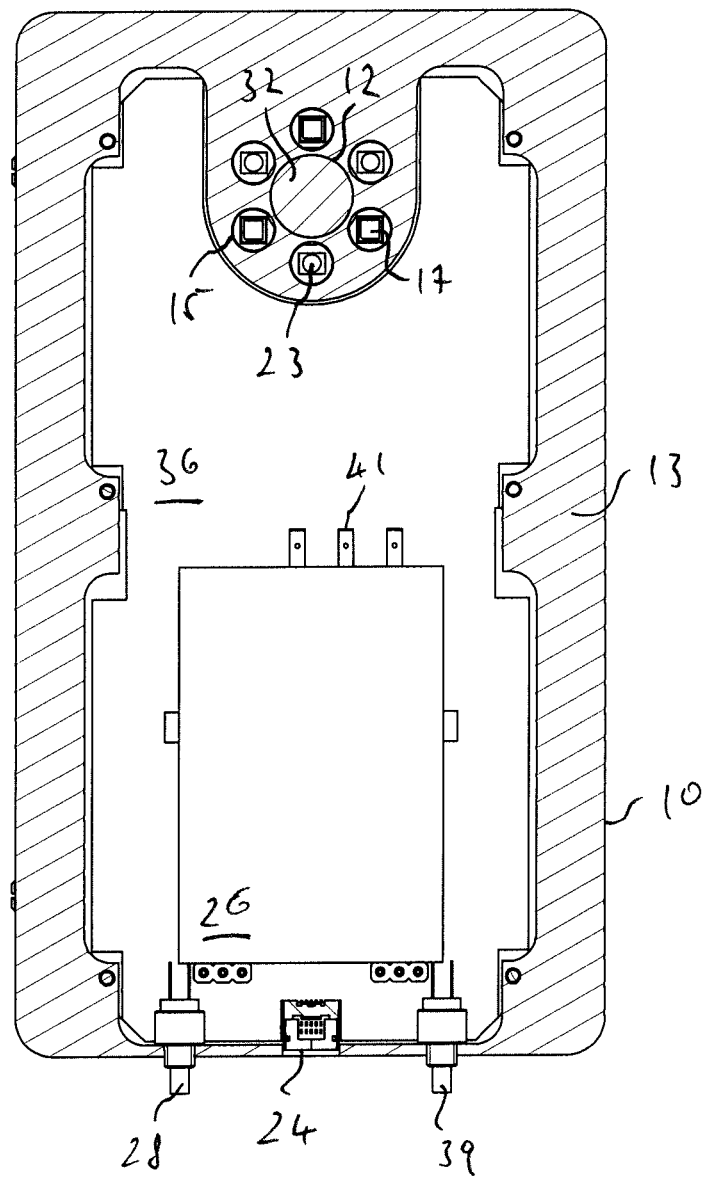
FIG. 4 shows a cross-section taken along line A-A in FIG. 3B.

FIG. 4 shows a cross-section taken along line A-A in FIG. 3B, which cross-section shows the internal structure of case 10 and housing 13. This internal structure is also shown in FIG. 5, which shows a cross-section taken along line B-B in FIG. 3A.

Figure 5:
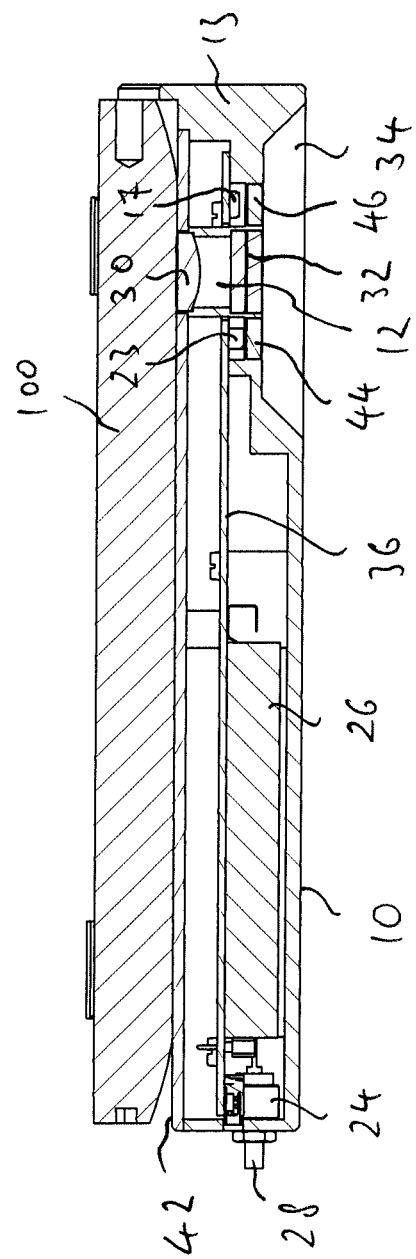
FIG. 5 shows a cross-section taken along line B-B in FIG. 3A.

As can be seen from FIGS. 4 and 5, housing 13 is closed by a removable lid 42. When lid 42 is closed, a lens 30, for example, a macro lens, is positioned in an opening formed in lid 42 and aligned with camera opening 12. Lens 30 forms part of an optical system for imaging (capturing, detecting) the to-be-examined region of the object to be authenticated positioned in front of camera opening 12 onto the lens (objective) of the camera of mobile phone 100. A two-part filter 32 is disposed in front of lens 30 in camera opening 12. A first filter is a color filter matched to the wavelength(s) of fluorescence of the pigment particles, i.e. the color filter transmits the wavelength(s) of fluorescence of the pigment particles and blocks or absorbs fluorescence of the carrier material (plastic) for the pigment particles occurring at different wavelengths, such that the measurement is not affected. A second filter is a UV and/or blue light blocking filter which prevents UV light and/or blue light from reaching lens 30 and thus the camera of mobile phone 100 disposed behind the lens 30. A spacer ring may be disposed between the first and the second filter. A circuit board 36 is mounted inside housing 13. An internal power supply 26, e.g., a rechargeable battery, for operating (powering) UV and/or blue light illumination unit 16 and white light illumination unit 22 is mounted on circuit board 36. Further, a communication interface 24 is provided on circuit board 36.

In the present embodiment, UV and/or blue light illumination unit 16 comprises three ultraviolet (UV) LEDs 17 disposed around opening 12 of the housing in the shape of a triangle, e.g., a regular triangle. The UV LEDs 17 are mounted on circuit board 36. UV LEDs 17 are aligned with corresponding openings in the bottom of recess 34, and each opening is respectively closed (covered) by a filter 46. Filters 46 absorb, for example, the visible part of the emission spectrum of UV LEDs 17. Similarly, white light illumination unit 22 comprises three white light LEDs 23 arranged at the three corners of a triangle around camera opening 12, such that the white light LEDs 23 and UV LEDs 17 alternate along a circle virtually formed by the six LEDs. White light LEDs 23 are also aligned with corresponding openings in the bottom of recess 34, and each such opening is respectively closed (covered) by a transparent cover 44. Although only UV LEDs are utilized in the present embodiment, it is noted here (and further explained below) that one, two or all of UV LEDs 17 may be replaced with blue light LED(s).

A first switch 28 and a second switch 39 are connected to circuit board 36 in housing 13. The first and second switches 28, 39 extend through housing 13 and are operable (i.e. can be manipulated or pressed) from outside of housing 13. Upon actuation (pressing) of first switch 28, white light LEDs 23 are selectively turned on and off, and upon actuation (pressing) of second switch 39, UV LEDs 17 are selectively turned on and off, in order to position case 10 and mobile phone 100 relative to the object to be authenticated and then excite (stimulate) the pigment particles contained in the object to be authenticated in the above-described manner. Power supply 26 includes a plurality of contact fingers (terminals) 41 extending on (from) circuit board 36 and serving to supply power (current) to the UV LEDs 17, white light LEDs 23, etc.

Figure 6:
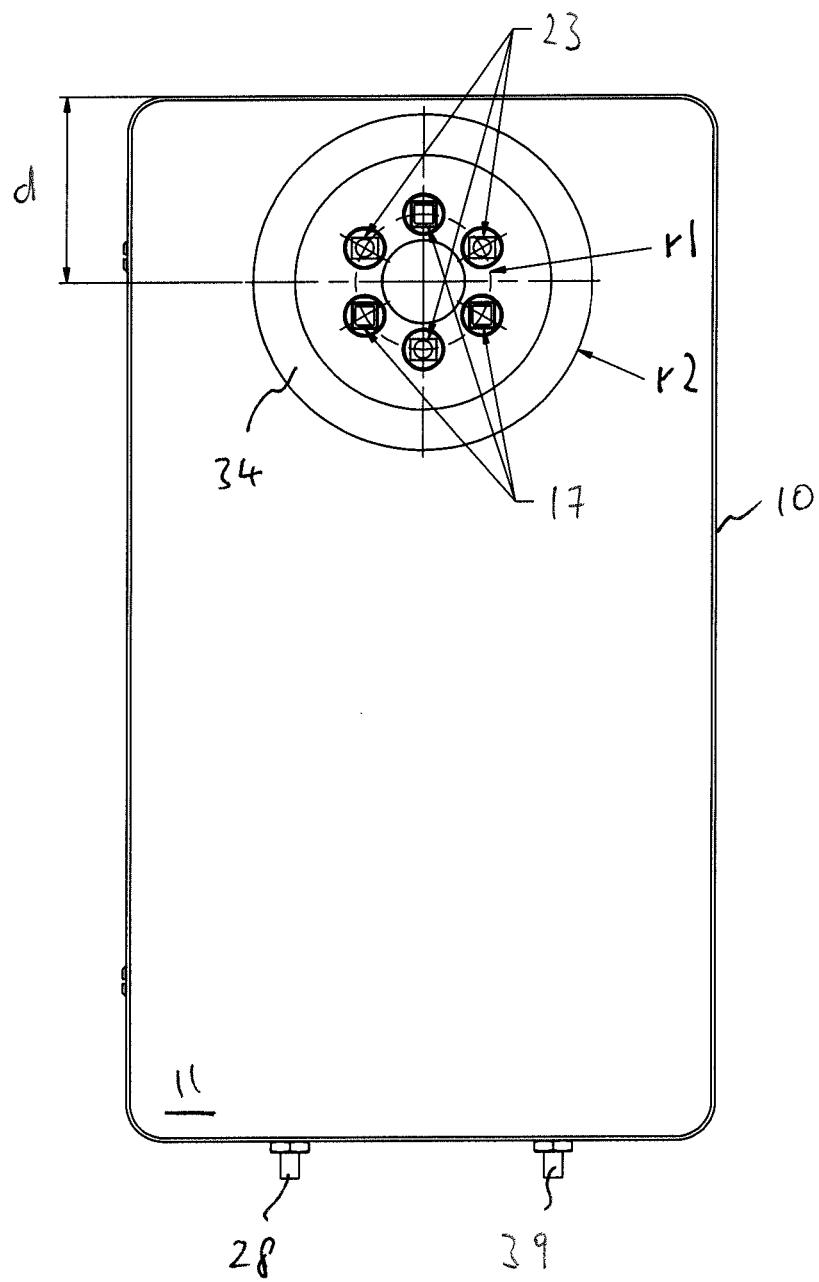
FIG. 6 shows a rear view of the first embodiment.

FIG. 6 shows a rear view of case 10, which shows the arrangement of UV LEDs 17 and white light LEDs 23 in more detail. As shown in FIG. 6, recess 34 is a circular recess having an outer diameter r2. The UV LEDs 17 and white light LEDs 23 are arranged on a circle having a smaller diameter r1 at the bottom of recess 34. The center of recess 34, i.e., of the circle having the diameter r1, is separated from a front side of case 10 by a distance d, which is selected such that the center of the objective (lens) of the camera of mobile phone 100 corresponds to the center of recess 34 after insertion of mobile phone 100 into case 10. In other words, depending on the dimensions and the position of the camera of mobile phone 100, an appropriate distance d is selected for the associated case 10. It should be appreciated that, depending on the configuration of mobile phone 100 (or another smart device), the position of the center (i.e., the camera lens opening 12) may also be adjusted in the lateral direction.

Figure 7:
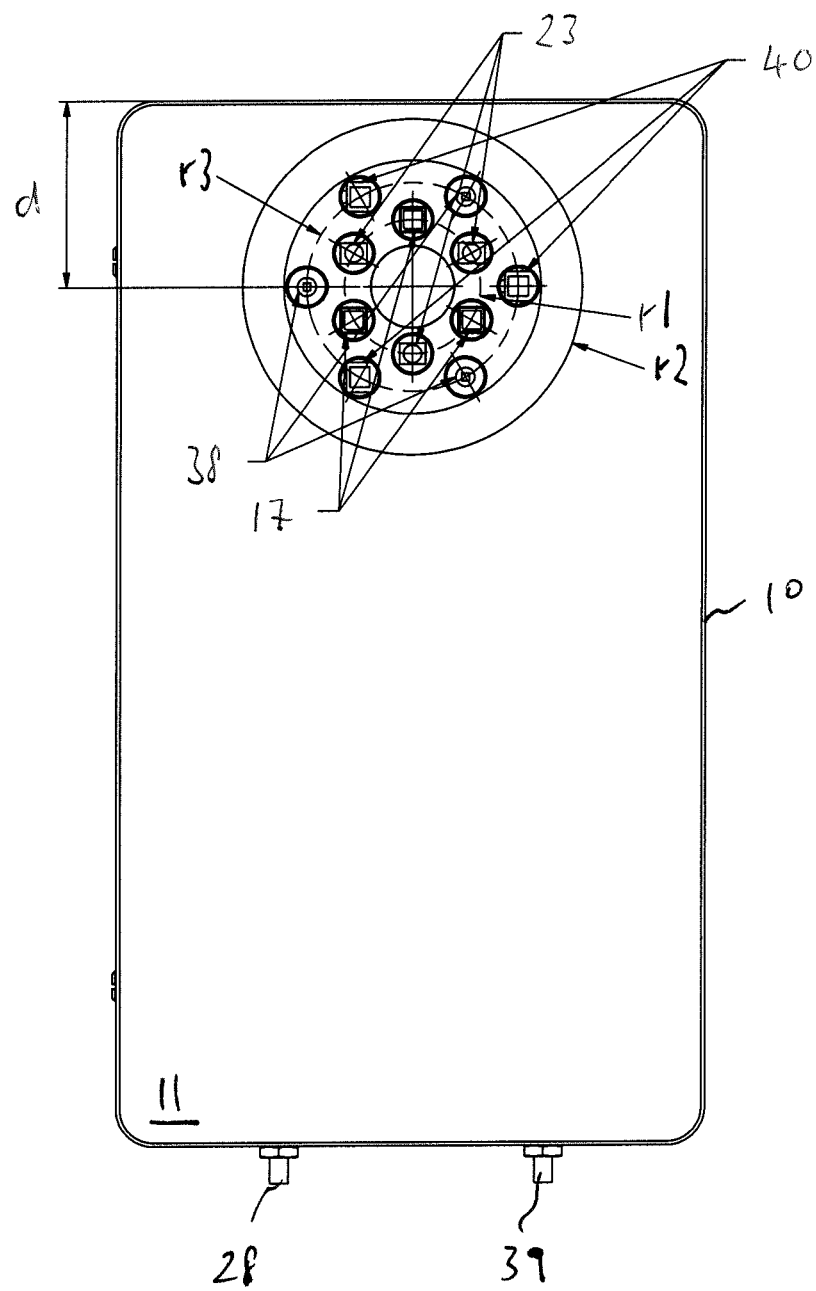
FIG. 7 shows a rear view of a second embodiment according to the present disclosure.

FIG. 7 shows a bottom view of another embodiment of case 10 according to the present disclosure. In the embodiment shown in FIG. 7, a plurality of infrared (IR) LEDs forming an IR illumination unit 38 are provided in addition to UV LEDs 17 and white light LEDs 23. The IR LEDs of IR illumination unit 38 are arranged on a circle having a diameter r3 that is larger than the diameter r1 in the embodiment shown in FIG. 7. The IR LEDs are also arranged at the corners of a triangle on the corresponding circle. A plurality of photo diodes are respectively provided between each pair of IR LEDs and form a detector unit 40 for detecting luminescence caused by the IR LEDs.

According to the embodiment shown in FIG. 7, in addition to the authentication of the object by determining a check code from pigment particles, the time constant and the intensity of IR-sensitive UP or DOWN converters may be determined. Therefore, characteristics of the object to be authenticated, e.g., the packaging film, may be determined based on the decay of the luminescence stimulated (excited) by IR illumination unit 38. With this information, conclusions can be drawn with respect to, for example, the manufacturer of the packaging film and the like. For this purpose, UV LEDs 17 are deactivated, and subsequently IR LEDs are activated. Particles contained in the object are excited (stimulated). Then, the IR LEDs are deactivated, and the resulting luminescence is detected by the photo diodes of detector unit 40. In this manner, for example, it can be confirmed in a quick test whether the object being examined is, for example, a packaging film manufactured by a particular manufacturer. It should be understood that such a quick test may also be performed prior to an examination by the UV LEDs 17 or independent of the same. Appropriate filters may be arranged (disposed) in front of the IR LEDs and the photo diodes.

In the embodiment shown in FIG. 7, an amplifier and a controller (e.g., a microprocessor configured to execute a computer program stored in memory) are also provided in case 10, which determine the decay from the intensity detected by the photo diodes. Data indicating the decay characteristics, for example, a time constant and an intensity, may be transmitted to mobile phone 100 via a communication interface such as communication interface 24 shown in FIGS. 4 and 5, for example, via Near Field Communication (NFC) or the like. The processor of mobile 100 may then perform additional analysis, if necessary, and display the results on the screen 110. However, it should be understood that the data may also or instead be transmitted to another external device for evaluation and/or display of the data/results on the other external device.

In the foregoing, exemplary embodiments of a case for a camera-equipped portable device such as a mobile phone have been described. It should be understood, however, that numerous modifications may be made to the exemplary embodiments without departing from the spirit or scope of the present disclosure and present invention.

For example, as was noted above, a blue light illumination unit may be provided as an alternative or in addition to UV LEDs 17 to excite (stimulate) the particles. For example, blue LEDs could be used instead of (or in addition to) UV LEDs 17. However, the expression "blue light illumination unit" as used herein is intended to also include any other light sources capable of emitting at least a substantial part of the emitted light in a range of wavelengths between 450 nm and 500 nm. For example, at least 50%, at least 60%, at least 70%, at least 80%, or at least 90% of the electromagnetic radiation emitted by the blue light illumination unit (e.g., blue LEDs) may preferably be in the range of 450-500 nm.

In addition or in the alternative, the case may be provided for a tablet computer or any other smart device having a camera as well as a display (screen) and a data processing device (e.g., a microprocessor). Further, the case does not necessarily have to be configured as shown in FIGS. 1 and 2. In particular, the case does not have to completely encase (enclose, surround) the portable device. For example, one or more attachment devices (e.g., attachment means) configured to be connected to the portable device could be provided instead of the case, such that the camera (or at least the lens thereof) of the portable device is disposed at a predetermined position with respect to the attachment device(s). In other words, the case does not necessarily have to comprise a camera lens opening. That is, the case or attachment device could also be configured such that the camera of mobile phone 100 is exposed to the object to be authenticated without a hole or opening for the camera lens in the bottom surface of the case (accessory). In such embodiments, the positioning of the apparatus or accessory with respect to the to-be-examined region of the object to be authenticated could be achieved using a spacer and by displaying position markings on the display (screen) of the smart device in the above-described manner.

Although the positioning of case 10 (in particular camera lens opening 12) with respect to the object to be examined using spacer 20 and white light illumination unit 22 have been described above, it should be understood that, in other embodiments, only one of (i) setting a distance to a predetermined distance and (ii) positioning with respect to the region to be examined using one or more position markings can be performed. In this respect, it should be understood that recess 34 does not necessarily have to be present for setting a particular (predetermined) distance, such that other means may be provided for achieving (setting) a particular (predetermined) distance between the camera of the mobile phone and the object to be authenticated. Representative positioning devices or positioning means include, but are not limited to: (i) a continuous projection (either closed curve, e.g., circular, or polygonal) extending perpendicularly, or at least substantially perpendicularly, from a surface of the accessory and surrounding the camera lens opening, (ii) a plurality of projections (i.e. discontinuous) extending perpendicularly, or at least substantially perpendicularly, from a surface of the accessory and being proximal to the camera lens opening, (iii) a combination of projection(s) (continuous or discontinuous) and a recess proximal to the camera lens opening, (iv) a transparent window (block) having a depth corresponding to the predetermined distance and being disposed on the camera lens opening, etc.

Although switches 28 and 39 are provided in the exemplary embodiment shown in FIGS. 6 and 7, it should be understood that in other embodiments the respective illumination units may also be turned on and off using a touch screen or buttons of the portable device, as long as a corresponding data link between case 10 and portable device 100 is provided or case 10 includes a corresponding communication circuit. To this end, a corresponding control unit on circuit board 36 may be connected to (in communication with) portable device 100, for example, via Near Field Communication (NFC). Alternatively, communication interface 24 of case 10 may be connected via a wire to a corresponding communication interface of the portable device 100.

In other exemplary embodiments, internal power supply 26 may be omitted. In such embodiments, case 10, i.e., the illumination units, may be supplied with power via a wired connection to the portable device, for example, via a USB connection or the like. Further, it should be understood that the authentication method described above may be automatically performed by software stored on the portable device, i.e., without the user having to turn the respective illumination units on and off. For example, switching from white light to UV light and/or blue light after successful positioning may be automatically performed (executed).

The software for portable device 100 may be provided in any appropriate form. For example, the software may be provided in form of an application software ("app") that may be downloaded onto the portable device. This has the advantage that the app may be updated without any problems and may be provided with additional features, such that future authentication methods may also be performed using case 10 and portable device 100.

Although the respective illumination units comprise LEDs in the above-described embodiments, it should be understood that any appropriate illumination means (source(s) of electromagnetic radiation) may be used for the UV illumination unit, the blue light illumination unit, the white light illumination unit and/or the IR illumination unit, including without limitation, incandescent lamps, fluorescent lamps, electroluminescence lamps, e.g., organic light-emitting diodes (OLED), etc.

The optical system having lens 30 (for example, a macro lens) and/or filters 32 described for the above-described embodiments may be omitted in other embodiments, as long as the optical system of the mobile device is capable of capturing images of the to-be-examined region of the object to be authenticated in an appropriate manner without such an optical system of the case. Further, it should be understood that the number and the arrangement of the respective illumination units (source(s) of electromagnetic radiation) may be selected in any appropriate manner, as long as sufficient illumination of the region to be examined is assured. Further, one or more or all of the filters described above may be omitted, if appropriate.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

Finally, additional embodiments according to the present teachings include, but are not limited to:

1. A case (10) for a camera-equipped portable device (100), such as a mobile phone or a tablet computer, comprising
   a camera opening (12),
   a retainer (14), which is formed to retain the portable device (100) so that the camera of the portable device (100) is aligned with the camera opening (12),
   a UV illumination unit (16), which is adapted to illuminate a to-be-authenticated object that is disposed in front of the camera opening (12), and
   a positioning device (18), which is formed to position the case (10) with respect to the to-be-authenticated object so that the camera opening (12) has a predetermined positional relationship to (with) a to-be-examined region of the object.

2. The case according to the above embodiment 1, wherein the positioning device (18) includes a spacer (20), which is formed to ensure a predetermined distance between the camera opening (12) and the to-be-examined region.

3. The case according to the above embodiment 2, wherein the spacer (18) includes a recess (34), which is formed in a bottom surface (11) of the case (10), which bottom surface faces the object, wherein at least the camera opening (12) or the UV illumination unit (16) is disposed within the recess (34).

4. The case according to any one of the above embodiments 1 to 3, wherein the positioning device (18) includes a white light illumination unit (22), which is formed to illuminate the to-be-examined region.

5. The case according to any one of the above embodiments 1 to 4, wherein the UV illumination unit (16) includes a plurality of UV LEDs (17), which are distributed around the camera opening (12) in the circumferential direction.

6. The case according to any one of the above embodiments 1 to 5, further having a communication interface (24), which is formed to communicate with an external device, for example, the portable device (100).

7. The case according to any one of the above embodiments 1 to 6, further having an internal power supply (26), for example, a rechargeable battery, for operating the UV illumination unit (16).

8. The case according to any one of the above embodiments 1 to 7, further having a switch (28) for selectively turning on and off the UV illumination unit (16).

9. The case according to any one of the above embodiments, further having a lens (30), for example, a macro lens, which is disposed in front of an objective of the camera when the camera of the portable device (100) is aligned with the camera opening (12), and makes possible a focusing of the to-be-examined region in the predetermined positional relationship.

10. The case according to any of the above embodiments, further having a filter (32), which is disposed in or in front of the camera opening (12).

11. The case according to the above embodiment 10, wherein the filter (32) comprises at least a color filter, which is matched to a fluorescence wavelength of pigment particles in the to-be-examined region, or a UV blocking filter, which functions such that no UV light reaches the camera of the portable device (100).

12. The case according to any one of the above embodiments, wherein the UV illumination unit (16) is mounted on a circuit board (36), which is affixed in a housing (13) of the case (10), wherein one or more openings (15) are formed in the housing (13), through which openings (15) the UV illumination unit (16) illuminates the to-be-authenticated object.

13. The case according to any one of the above embodiments, further having an IR illumination unit (38), which is adapted to illuminate the to-be-authenticated object that is disposed in front of the camera opening (12), and a detector unit (40) for detecting luminescence in the to-be-examined region.

14. The case according to the above embodiment 12, further having a controller for determining a characteristic decay behavior (decay time, fall time or relaxation) of the luminescence and transmitting a result of the determination to the portable device (100).

15. A method for authenticating a to-be-authenticated object, having the following steps:
   illuminating a to-be-examined region of the object with white light to identify position markings,
   sensing (detecting, capturing) the position markings using a camera,
   displaying the position markings on a display (screen),
   positioning the camera using the displayed position markings,
   illuminating the to-be-examined region with UV light,
   determining a fluorescence pattern in the to-be-examined region, and
   comparing the fluorescence pattern with a stored reference pattern.

16. The method according to the above embodiment 15, further with the following steps:
   illuminating the to-be-examined region with IR light,
   recording (plotting, determining) a decay behavior of a luminescence in the to-be-examined region,
   determining a material-specific time constant from the decay behavior.

17. An apparatus (10) for a camera-equipped portable device (100), such as a mobile phone or a tablet computer, comprising
   a connecting portion (14), which is formed to connect with the portable device (100) so that the camera of the portable device (100) is disposed at a predetermined position with respect to the apparatus (10),
   a UV illumination unit (16), which is adapted to illuminate a region in a field of view of the camera, and
   a positioning device (18), which is formed to position the apparatus with respect to a to-be-examined region of an to-be-authenticated object so that the to-be-examined region is in the field of view of the camera and the camera has a predetermined positional relationship to (with) the to-be-examined region.

I claim:

1. An accessory configured to be attached to a portable device equipped with a camera, the accessory comprising:
   a camera lens opening,
   a retainer configured to retain the portable device such that a lens of the camera of the portable device is aligned with the camera lens opening,
   at least one source of electromagnetic radiation in the range of ultraviolet and/or blue wavelengths, the source being configured to illuminate an object to be authenticated when the object is disposed in front of the camera opening, and
   a positioning device configured to position the accessory with respect to the object to be authenticated so that the camera lens opening has a predetermined positional relationship with a to-be-examined region of the object.

2. The accessory according to claim 1, wherein the positioning device includes a spacer configured to space the camera lens from the to-be-examined region of the object by a predetermined distance.

3. The accessory according to claim 2, wherein:
the spacer includes a recess defined in a surface of the accessory configured to face the object, and
the camera lens opening and/or the at least one source of electromagnetic radiation is disposed within the recess.

4. The accessory according to claim 3, wherein:
the positioning device includes at least one source of white light configured to illuminate the to-be-examined region of the object,
the at least one source of electromagnetic radiation includes a plurality of light emitting diodes that emit electromagnetic radiation in the ultraviolet and/or blue wavelength range and that are circumferentially distributed around the camera lens opening, at least 50% of the emitted wavelengths being in the range of 450-500 nm,
the at least one source of electromagnetic radiation is mounted on a circuit board affixed to a housing of the accessary,
at least one opening is formed in the housing, and
the at least one source of electromagnetic radiation is configured to illuminate the object to be authenticated through the at least one opening.

5. The accessory according to claim 4, further comprising:
a communication interface configured to communicate with an external device,
an internal power supply configured to supply current to the at least one source of electromagnetic radiation,
a switch configured to selectively turn on and off the at least one source of electromagnetic radiation,
a second lens disposed in the camera lens opening and configured to be located in front of the lens of the camera when the camera lens of the portable device is aligned with the camera lens opening, the second lens being configured to focus the to-be-examined region of the object to be authenticated when it is located in the predetermined positional relationship,
a filter arranged in the camera lens opening adjacent to the second lens, the filter including (i) a color filter matched to a wavelength of fluorescence of pigment particles in the to-be-examined region and (ii) a UV and/or blue light blocking filter configured to prevent UV light and/or blue light from reaching the camera of the portable device,
at least one second source of electromagnetic radiation in the range of infrared wavelengths that is configured to illuminate the object to be authenticated when it is disposed in front of the camera lens opening,
a detector configured to detect luminescence resulting from excitation by infrared, and
a non-transitory computer readable medium encoded with a computer program coupled to a processor to determine a characteristic decay behavior of the detected luminescence from infrared excitation and to transmit a result of the determination to the portable device.

6. The accessory according to claim 1, wherein the positioning device includes at least one source of white light configured to illuminate the to-be-examined region of the object.

7. The accessory according to claim 1, wherein the at least one source of electromagnetic radiation includes a plurality of light emitting diodes that emit electromagnetic radiation in the ultraviolet wavelength range and that are distributed around the periphery of the camera lens opening.

8. The accessory according to claim 1, wherein the at least one source of electromagnetic radiation is configured to emit at least 50% of its emitted light in wavelengths between 450 nm and 500 nm.

9. The accessory according to claim 1, wherein the at least one source of electromagnetic radiation includes a plurality of light emitting diodes that emit electromagnetic radiation in the blue wavelength range and that are distributed around the periphery of the camera lens opening.

10. The accessory according to claim 1, further comprising a communication interface configured to communicate with an external device.

11. The accessory according to claim 1, further comprising an internal power supply configured to supply current to the at least one source of electromagnetic radiation.

12. The accessory according to claim 1, further comprising a switch configured to selectively turn on and off the at least one source of electromagnetic radiation.

13. The accessory according to claim 1, further comprising:
a second lens disposed in the camera lens opening and configured to be located in front of the lens of the camera when the camera lens of the portable device is aligned with the camera lens opening, the second lens being configured to focus the to-be-examined region of the object to be authenticated when it is located in the predetermined positional relationship.

14. The accessory according to claim 1, further comprising a filter arranged in or in front of the camera lens opening.

15. The accessory according to claim 14, wherein the filter includes:
a color filter matched to a wavelength of fluorescence of pigment particles in the to-be-examined region and/or
a UV and/or blue light blocking filter configured to prevent UV light and/or blue light from reaching the camera of the portable device.

16. The accessory according to claim 1, wherein:
the at least one source of electromagnetic radiation is mounted on a circuit board affixed to a housing of the accessary,
at least one opening is formed in the housing, and
the at least one source of electromagnetic radiation is configured to illuminate the object to be authenticated through the at least one opening.

17. The accessory according to claim 1, further comprising:
at least one second source of electromagnetic radiation in the range of infrared wavelengths that is configured to illuminate the object to be authenticated when it is disposed in front of the camera lens opening, and
a detector configured to detect luminescence resulting from excitation by infrared.

18. The accessory according to claim 17, further comprising:
a non-transitory computer readable medium encoded with a computer program coupled to a processor to determine a characteristic decay behavior of the detected luminescence from infrared excitation and to transmit a result of the determination to the portable device.

19. A method for authenticating an object to be authenticated, comprising:
illuminating a to-be-examined region of the object with white light in order to identify at least one position marking on the object,
imaging the at least one position marking using a camera, displaying the at least one position marking on a display,
positioning the camera relative to the object using the displayed position marking(s),
illuminating the to-be-examined region with ultraviolet and/or blue electromagnetic radiation,
capturing a fluorescence pattern in the to-be-examined region,
storing the captured fluorescence pattern in a digitized format, and
comparing the digitized fluorescence pattern to a digitally-stored reference pattern.

20. The method according to claim 19, further comprising:
illuminating the to-be-examined region with infrared electromagnetic radiation,
detecting a decay of luminescence in the to-be-examined region, and
determining a material-specific time constant from the decay.

21. An apparatus configured to be attached to a portable device, the apparatus comprising:
at least one connector configured to connect to the portable device so that a lens of the camera of the portable device is disposed at a predetermined position with respect to the apparatus,
at least one source of electromagnetic radiation in the range of ultraviolet and/or blue wavelengths, the source being configured to illuminate a region in a field of view of the camera, and
a positioning device configured to position the apparatus with respect to a to-be-examined region of an object to be authenticated so that the to-be-examined region is located in the field of view of the camera and the camera has a predetermined positional relationship with the to-be-examined region.

* * * * *